United States Patent [19]
Chen

[11] Patent Number: 5,547,113
[45] Date of Patent: Aug. 20, 1996

[54] AUTOMATIC FEED SUPPLY MACHINE

[76] Inventor: Ming J. Chen, 47-2, Lane 25, Chingli Street, Tucheng Hsiang, Taipei Hsien, Taiwan

[21] Appl. No.: 255,082

[22] Filed: Jun. 7, 1994

[51] Int. Cl.⁶ ............... B65D 83/00; B67D 3/00; G04C 23/00
[52] U.S. Cl. ............ 222/642; 222/156; 222/203; 222/333; 222/505; 222/181.2
[58] Field of Search ................ 222/642, 650, 222/651, 156, 157, 181, 185, 196, 199, 200, 333, 505, 202, 203; 141/360–362

[56] References Cited

U.S. PATENT DOCUMENTS

| | | |
|---|---|---|
| 2,420,812 | 5/1947 | Brunner ............... 222/199 X |
| 2,568,332 | 9/1951 | Genovese ............. 222/199 X |
| 3,217,940 | 11/1965 | Fahn et al. ........... 222/199 X |
| 3,584,765 | 6/1971 | Orr, Jr. et al. ....... 222/199 X |
| 3,659,753 | 5/1972 | Jäger .................... 222/199 |
| 3,747,810 | 7/1973 | Graser .................. 222/199 |
| 4,378,078 | 3/1983 | Daniels ................ 222/196 X |
| 4,565,159 | 1/1986 | Sweeney .............. 222/199 X |
| 4,722,300 | 2/1988 | Walker et al. ........ 222/650 X |
| 5,154,547 | 10/1992 | Young .................. 222/196 X |

*Primary Examiner*—Kevin P. Shaver

[57] ABSTRACT

An automatic feed supply machine comprising a housing containing a feed container. The feed container has a flexible bottom wall and a pushing plate for moving feed to an outlet. The outlet is closed by a disk. A motor vibrates the flexible bottom and moves the pushing plate. A common actuating lever moves the disk to an open position and operates the motor to dispense feed through the opening and into and through a nozzle.

4 Claims, 5 Drawing Sheets

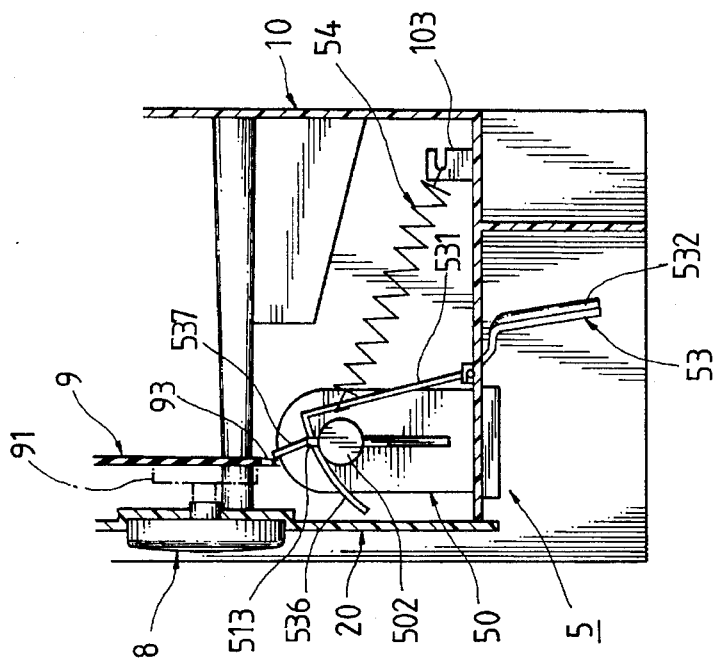
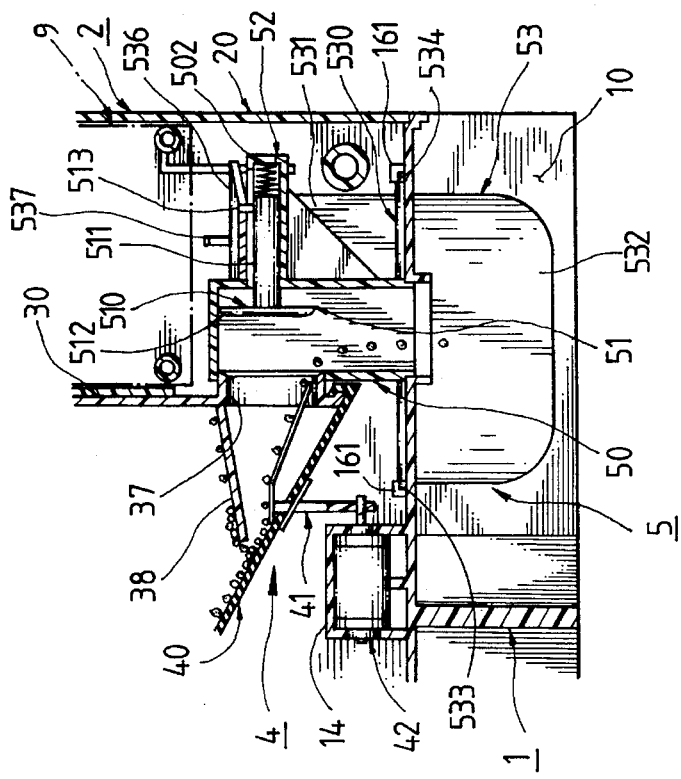

AUTOMATIC FEED SUPPLY MACHINE

BACKGROUND OF THE INVENTION

The present invention is related to a small-size automatic feed supply machine for powdered or granulated food or material which is particularly suitable for the users at home in general. Nowadays there are various large-size automatic feed supply machines for powdered or granulated food or material used by the circles of industry extensively but no small-size automatic feed supply machine for powdered or granulated food or material is available for home use, so it is quite inconvenient to prepare coffee or milk or to feed pets. In view of the above, the present inventor invents an automatic feed supply machine through his research and development: all to do is to hold a cup or container to press against a trigger on a lever-pushing plate in a switch device, a suitable quantity of said food or material will drop into the cup or container for preparing food or feeding pets.

SUMMARY OF THE INVENTION

The present invention is to offer an automatic feed supply machine which consists essentially of a main base, a panel, a feed container, a feed-dropping device, a switch device and a hanging frame, and the operation and use of the present machine are very convenient: only to put the powdered or granulated food or material into the feed container and to set a feed-dropping quantity each time, the user may hold a cup or container to press against a trigger on a lever-pushing plate in the switch device, the food or material will drop into the cup or container from a feed-dropping nozzle in line with the preset quantity, the automatic feed-dropping action is extremely smooth so the powdered or granulated food or material in the feed container will drop down entirely and more easily, and the assembly of components of this machine is simpler and more convenient.

BRIEF DESCRIPTION OF THE DRAWINGS

FIG. 6 is a front schema of the present invention during use.

FIG. 7 is a side schema of the present invention during use.

DETAILED DESCRIPTION OF THE PREFERRED EMBODIMENT

Figure 4:
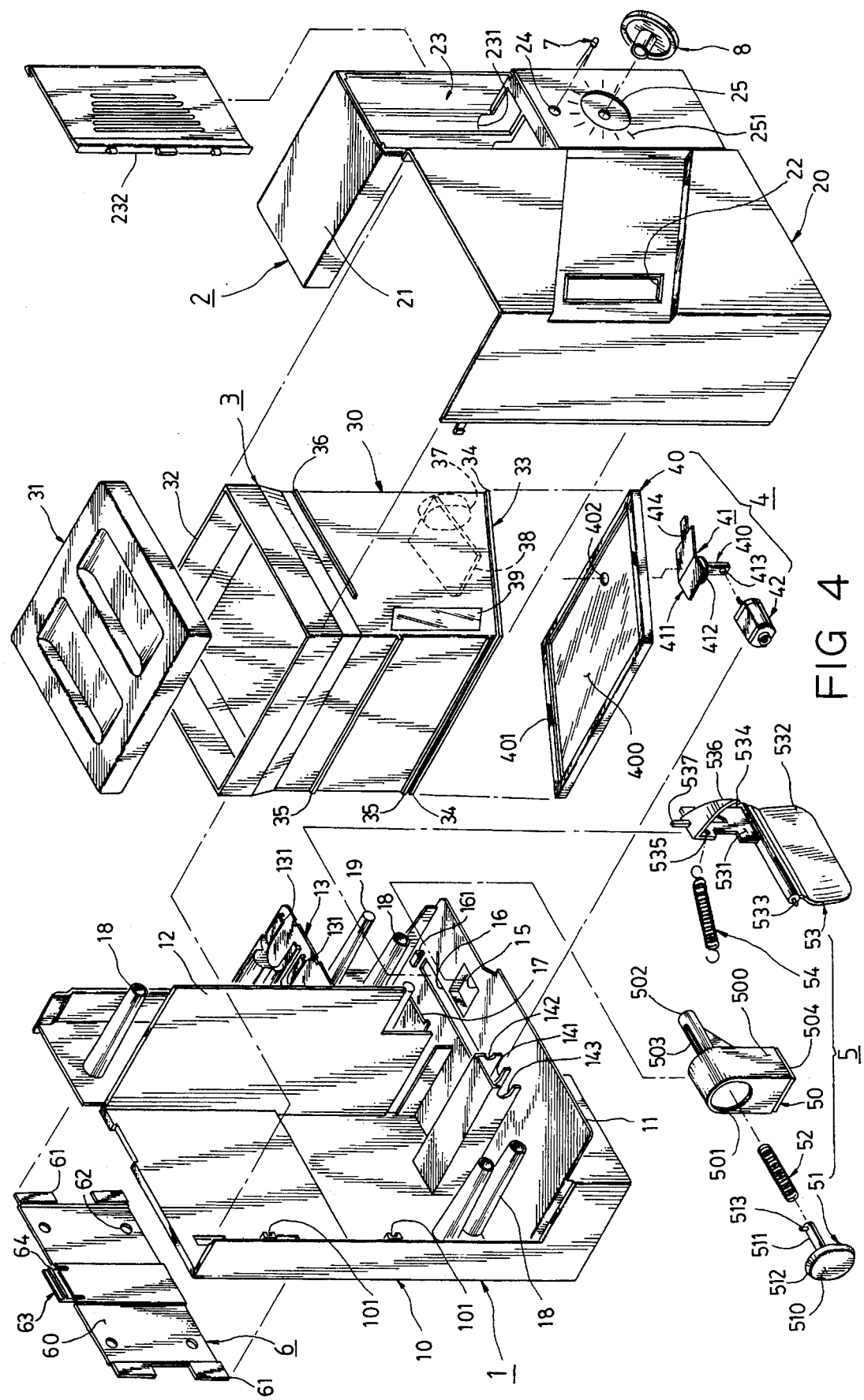
FIG. 4 is an elevational breakdown view of the present invention.

The present invention may be best described in detail in conjunction with the accompanying drawings hereinafter:

As shown in FIG. 4, an automatic feed supply machine according to the present invention consists essentially of a main base 1, a panel 2, a feed container 3, a feed-dropping device 4, a switch device 5 and a hanging frame 6, wherein the switch device 6 comprises a feed-dropping nozzle 50, a piston 51, a spring 52, a lever-pushing plate 53 and a tension spring 54, and the feed-dropping device 4 comprises a feed-vibrating plate 40, a feed-vibrating crank 41 and a motor 42.

Figure 3:
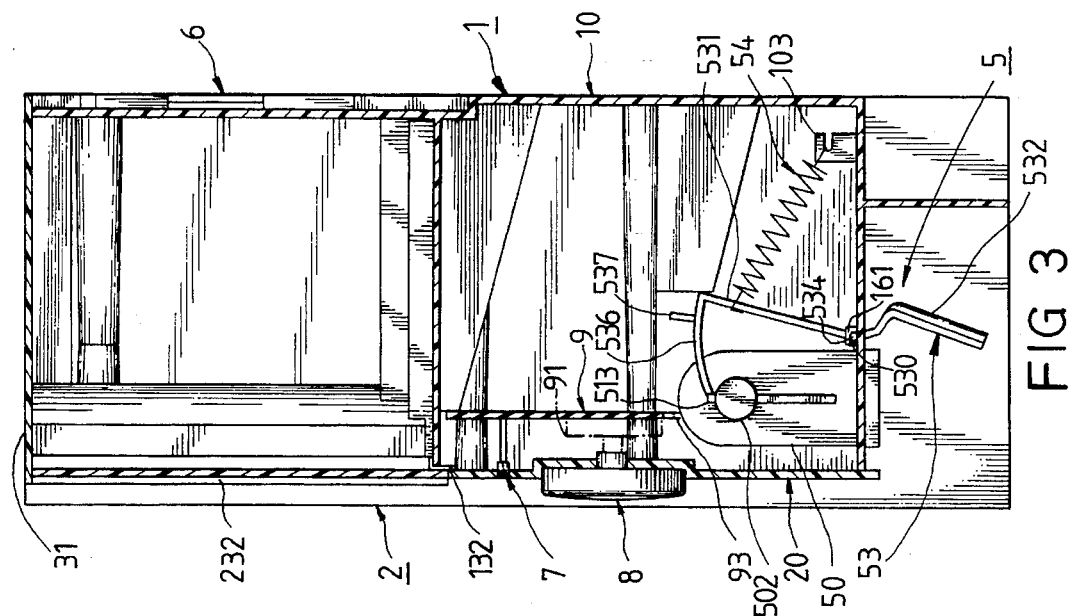
FIG. 3 is a longitudinal sectional view along the line 3—3' of FIG. 1.

The main base 1 as shown in FIG. 4 has a base body 10 which is a plate with a section in the shape of a reverse and flat U, a horizontal base plate 11 at lower end is designed to mount a motor mounting frame 14, a feed-dropping nozzle inserting hole 15 and a lever-pushing plate groove 16; a longitudinal partition board 12 extending from the uppermost end to a horizontal base plate 11 is provided to the right side nearby the center to form a space on the left side for mounting the feed container 3 and a space on the right side for mounting battery; a lateral battery supporting plate 13 with two-set opposite reverse L-shaped flanges 131 on the upper side is provided in a position at the center on the right side of said longitudinal partition board 12 so that a conducting board 132 for positive and negative poles of battery is inserted between each set of opposite L-shaped flanges 131 respectively as shown in FIG. 3; and a positioning plate 17 for catching the feed-dropping nozzle 50 is provided in a position on the right side nearby the lower end of said longitudinal partition board 12. Furthermore, a plurality of horizontal cylindrical protruding pillars 18 are provided in the suitable positions on the plate of base body 10 to fix the body of panel 2 for assembly; a plurality of horizontal protruding pillars 19 are provided on the plate of base body 10 on the lower side of battery supporting plate 13 for mounting a printed circuit board (PCB) 9 as shown in FIG. 2; in addition, a lateral square C-shaped inserting edge 101 to support the feed container 3 is provided in the upper and lower positions on the inner wall on the left side of plate of said base body 10 respectively and four small reverse L-shaped engaging pieces 102 are provided on the back side of plate of said base body 10 as shown in FIG. 5 so as to install a hanging frame 6 for hanging up unto a wall.

Figure 5:
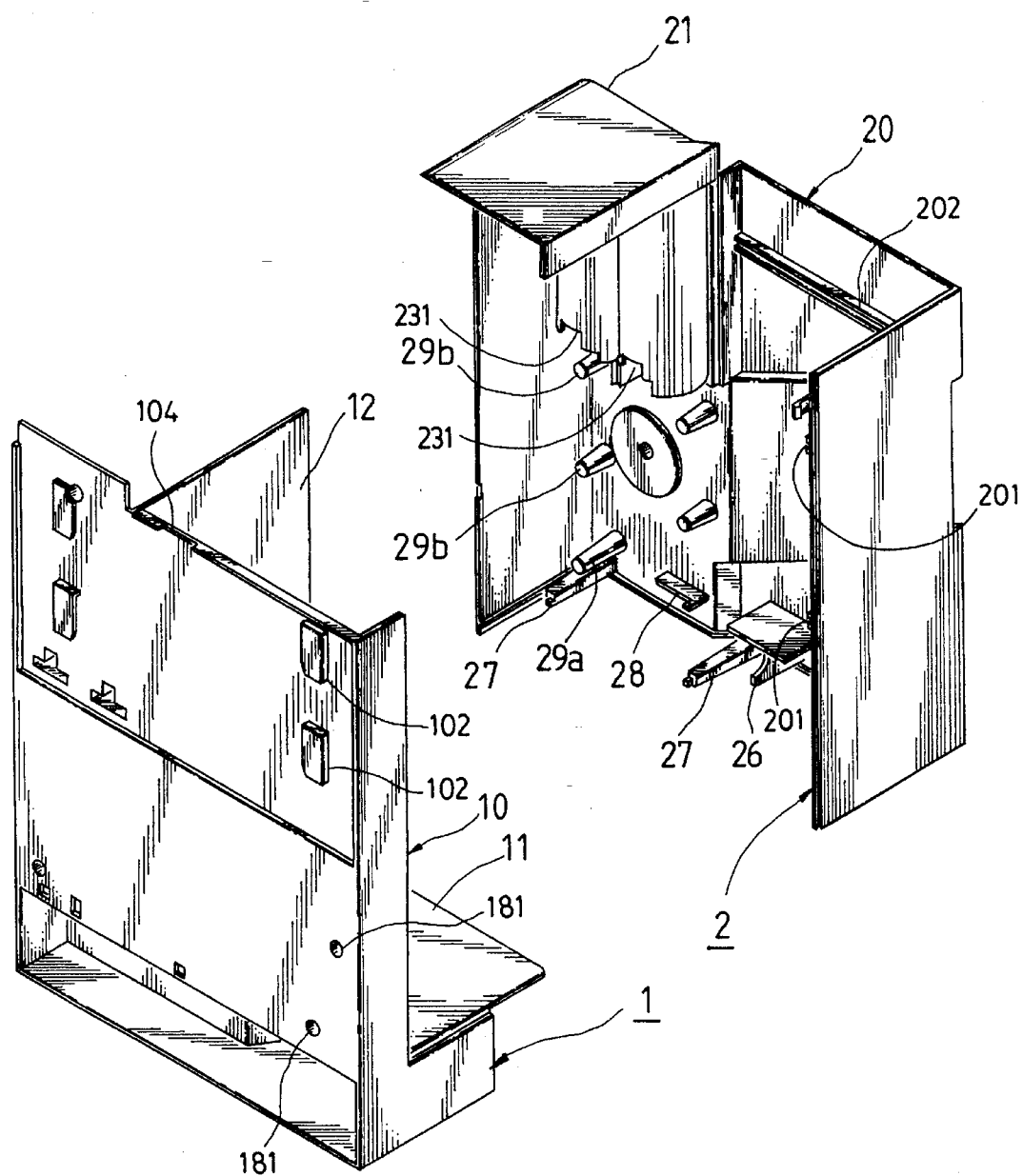
FIG. 5 is an elevational breakdown view of main base and panel back of the present invention.

The panel 2 as shown in FIG. 4 and 5 has a plate body 20 which is in the shape of a square U, wherein an upper wall plate 21 is provided on the right upper side, the left side is open for mounting the feed container 3, a perspective window 22 is provided on the left side on the front, the right side thereof is provided with a W-shaped battery mounting groove 23 with a movable lid 232; and the lower side thereof is provided with a small hole 24 and a large fish-eye hole 25 respectively for installing a LED (light-emitting diode) power source indicating lamp 7 and a knob 8. The inner side of said plate body 20, as shown in FIG. 5, is provided with a motor fixing frame 26, two lever-pushing plate fixing pillars 27, a feed-dropping nozzle fixing plate 28 and a plurality of horizontal cylindrical protruding pillars 29a for fixing the main base 1 and a plurality of horizontal protruding pillars 29b for fixing PCB 9 respectively in the positions corresponding to those of various members provided on the base body 10 of main base 1, so when a plurality of screws penetrate from a plurality of holes 181 on the back side of base body 10 as shown in FIG. 5 through a plurality of horizontal cylindrical protruding pillars 18 on the base body 10 to lock a plurality of cylindrical protruding pillars 29a on the plate body 20, the main base 1 and the panel 2 can be assembled with each other, and during such an assembly, the motor 42 can be installed between the motor mounting frame 14 on the base body 10 and the motor fixing frame 26 on the plate body 20, the feed-dropping nozzle 50 installed in the square hole 15 on the horizontal base plate 11 at the lower end of base body 10 can be installed between the positioning plate 17 on the base body 10 and the fixing plate 28 on the plate body 20, the lever-pushing plate 53 disposed in the lever-pushing plate groove 16 on the horizontal base plate 11 can be fixed between the small reverse L-shaped engaging edge 161 on the two sides of said groove 16 and two fixing pillars 27 on the plate body 20, and the PCB 9 on the horizontal protruding pillars 19 on the base body 10 can be fixed between the horizontal protruding pillars 19 and the horizontal protruding pillars 29b on the plate body 20; meantime, the feed container 3 can be installed between the base body 10 and the plate body 20 which have been assembled with each other, the battery supporting plate 13 on the base body 10 can be exactly inserted into two fillisters 231 on the back side of battery mounting groove 23 on the plate body 20 as shown in FIG. 5, so that the positive and negative poles of two-set batteries in the battery mounting grooves 23 can press against two conducting plates 132 inserted on the battery supporting plate 13 to be connected to PCB 9. In addition, two square C-shaped inserting edges 201 and a square C-shaped inserting edge 202 are provided to the upper and lower positions on the inner wall on the left side of plate body 20 and to the inner wall on the front side thereof respectively, so that two square C-shaped inserting edges 101 on the base body 10 together with the said inserting edges 201, 202 jointly support the feed container 3 without lossening the feed container 3. The feed container 3, as shown in FIG. 4, has a square through container body 30 of which the upper end is a plane opening edge 32 to be covered with a movable lid 31, and the lower end is an inclined opening edge 33 with higher left and lower right, and a designed flange 34 is around the inclined opening edge 33 for mounting a feed-vibrating plate 40; two lateral protruding strips 35 and a lateral protruding strip 36 are provided to the upper and lower positions on the outer wall on the front side thereof respectively to keep the container 3 in place in the assembly of main base 1 and panel 2 to be supported and fixed by the square C-shaped inserting edges 101, 201, 202 inside the base body 10 and plate body 20. Furthermore, a feed-dropping outlet 37 is provided in a position on the right side of container body 30 and adjoining the inclined opening edge 33 to let the food or materials in the container 3 drop out from the outlet 37; meantime, in order to prevent such an undesirable phenomenon from taking place, namely, the food or material in the container 3 drops out quickly from the said outlet 36 without quantitative control to form a vertical and cylindrical hollow in in the said food or material, a feed damper 38 with higher right and lower left on the right wall of container body 30 on the upper edge of feed-dropping outlet 37 extends left to the inclined opening edge 33 so that when the food or material drops from the feed-dropping device 4, the food or material in the container body 30 will drop out from the feed-dropping outlet 37 through the space between the feed damper 38 and the feed-vibrating plate 40 in a zigzag way for easy quantitiative control without the phenomenon of foregoing hollow of food or material which will not entirely drop out. In addition, in order to insepct whether the food or materials in the container 3 runs low or not, a window 39 with a transparent plastic plate or a piece of glass may be provided on one side on the front wall of container body 30.

The feed-dropping device 4 has the members as shown in FIG. 4, wherein the feed-vibrating plate 40 comprises a square C-shaped engaging edge 401 on the outer periphery of a rubber plate 400 with an area of at least one tenth smaller than that of the inclined opening edge 33 at the lower end of container body 30 for mounting a feed-vibrating crank 41 on the rubber plate 400 through a small hole 402 thereon; the feed-vibrating plate 40 is mounted on a flange 34 around the inclined opening edge 31 at the lower end of container body 30 through the square C-shaped engaging edge 40 around the rubber plate 400 so as to engage with the feed container 3, to close the lower end of container body 30 and to be the base plate of container body 30. The feed-vibrating crank 41 has a rod 410 Of which the upper end is provided with an inclined feed-pushing plate 411 and an inclined round positioning disk 412, and a crank rod with a lateral small through hole 413 nearby lower end of the rod 410 is installed in the small hole 402 on the rubber plate 400, and the feed-vibrating plate 40 is tightly caught between the feed-pushing plate 411 and the round disk 412, and the inclined angle of said round disk 412 is designed to be the same as that of the inclined opening edge 33 at the lower end of container body 30, so that when assembled, the feed-vibrating plate 40 can exactly and entirely contact the lower surface of rubber plate 400 as shown in FIG. 2; the inclined feed-pushing plate 411 is in an inclined state to cooperate with the round disk 412 to squeeze the feed-vibrating plate 40, the protruding plate 414 extending from the front end as shown in FIG. 4 can exactly extend to the outer edge nearby the feed-dropping outlet 37 on the container body 30 but cannot contact the inner wall of said outlet 37. The motor 42 is a small d.c. motor inserted in the three C-shaped notches 141 (smaller), 142 (middle), 143 (larger) on the motor frame 14 on the base body 10 as shown in FIG. 4, and the motor shaft is inserted into the lateral small through hole 413 nearby the lower end of rod 410 of the feed-vibrating crank 41 as shown in FIG. 2, and then the main base 1 and the panel 2 are assembled with each other, so that the motor 42 is fixed between the motor mounting frame 14 on the base body 10 and the motor fixing frame 26 on the plate body 20.

Figure 2:
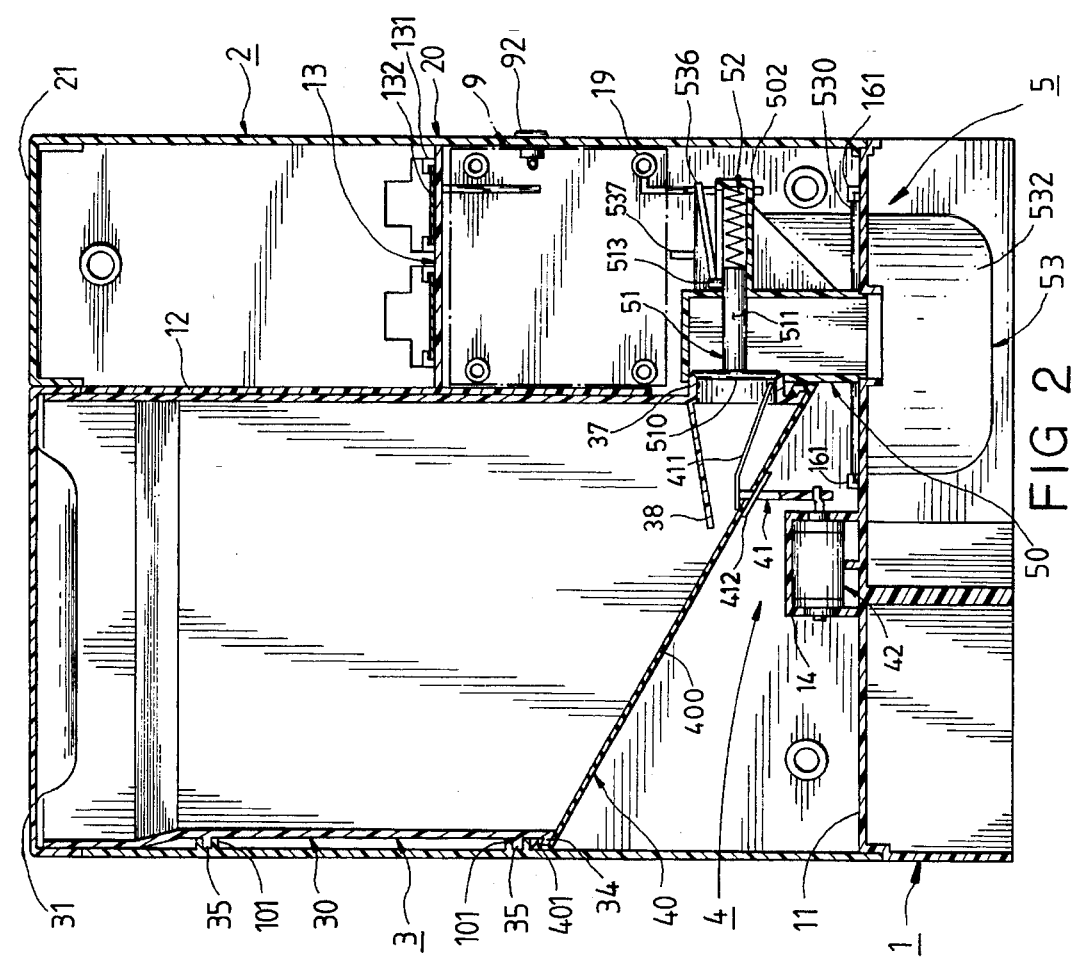
FIG. 2 is a longitudinal sectional view along the line 2—2' of FIG. 1.

The switch device 5 has the members as shown in FIG. 4 wherein the feed-dropping nozzle 50 is a square tube 500 with a closed upper end, an elliptic hole 501 is provided on one side of said tube 500, a small shaft tube 502 with a long slot 503 on the upper side and a closed terminal is provided on another side therefof, and the lower end thereof is provided with a stepped supporting edge 504 with a smaller diameter to be inserted into the inserting square hole 15 as shown in FIG. 2; the piston 51 has a shaft rod 511 with a small upward protruding shaft 513 at the terminal of said rod 511 at the center on the back side of an elliptic disk 510 with an inclined edge 512; the spring 52 is mounted behind the small shaft tube 502 of feed-dropping nozzle 50, then the shaft rod 511 on the back side of piston 51 is inserted into the small shaft tube 502 from the lower end of square tube 500 of the feed-dropping nozzle 50, the small protruding shaft 513 at the terminal of said rod 511 is inserted into the long slot 503 on the small shaft tube 502, and the elliptic disk 510 is disposed on the inner edge of the elliptic hole 510 on the square tube 500; the lever-pushing plate 53 has a shaft rod 530 with a small protruding shaft 533, 534 at both ends thereof, and a "bird's head" shaped plate 531 and a reverse L-shaped plate 532 are respectively extended from the right upper side and the lower side thereof; the bird's head shaped plate 531 has a small hole 535 to mount a tension spring 54, such a lever-pushing plate 53 is inserted into the lever-pushing plate mounting groove 16 on the horizontal base plate 11 of base body 10 through the shaft rod 530, and the small protruding shafts 533, 534 at the two ends of shaft rod 530 are inserted into the small reverse L-shaped engaging edge 161 at the two ends of long slot 16 as shown in FIG. 2, another end of tension spring 54 on the bird's head shaped plate 531 is hooked onto the protruding piece 103 on the horizontal base plate 11 of the base body 10, and then the lever-pushing plate 53 is tightly pressed and fixed by the two fixing pillars 27 on the plate body 20 which is assembled with the base body 10.

The hanging frame 6 as shown in FIG. 4 has a plate body 60 with some holes 62 thereon and a pair of protruding pieces 61 on the upper and lower ends on the two side edges thereof, and the central upper side of plate body 60 is provided upward with an elastic piece 63 of a lateral flange 64 on the front side thereof. The hanging frame 6 is designed to be hung up onto a wall through inserting the four small reverse L-shaped engaging pieces 102 on the back side of base body 10 (as shown in FIG. 5) into the four protruding pieces 61 on the two sides of plate body 60, and catching the lateral flange 64 on the elastic piece 63 on the central upper side onto the flat U-shaped notch 104 on the central upper side of base body 10, the present invention can be stably hung on a wall. The circuits on PCB 9 are provided as shown in FIG. 3, and the LED power source indicating lamp 7 in a small hole 24 on the front side of plate body 20 is welded on the circuits of said PCB 9, and only the illuminator of said indicating lamp 7 is visible from the small hole 24; the knob 8 on the large fish-eye hole 25 is connected to a variable resistor 91 on the PCB 9 as shown in FIG. 3, so turning the knob 8 can adjust the variable resistor 91 to set a thing device to start up the motor-running time and the feed-dropping quantity. The power source input ends of positive and negative poles of PCB 9 are respectively inserted into the conducting plate 132 of positive and negative poles on the two opposite reverse L-shaped flanges 131 on the battery supporting plate 13 on the base body 10 as shown in FIG. 3 so the battery (not shown in the drawings) disposed in the battery mounting groove 23 on the plate body 20 supplies power source to said PCB 9. In order to conveniently and directly insert a socket of home electric appliances in general to be the power source supply of the present invention, a power source socket 92 for external connection can be installed in a suitable position between the main base 1 and the panel 2 as shown in FIG. 2 so as to be connected in parallel with the power source input end on the PCB 9, and a power source extension wire with rectifier and transformer can be inserted into the power source socket of home electric appliances to replace the power source supply of the foregoing battery.

Figure 1:
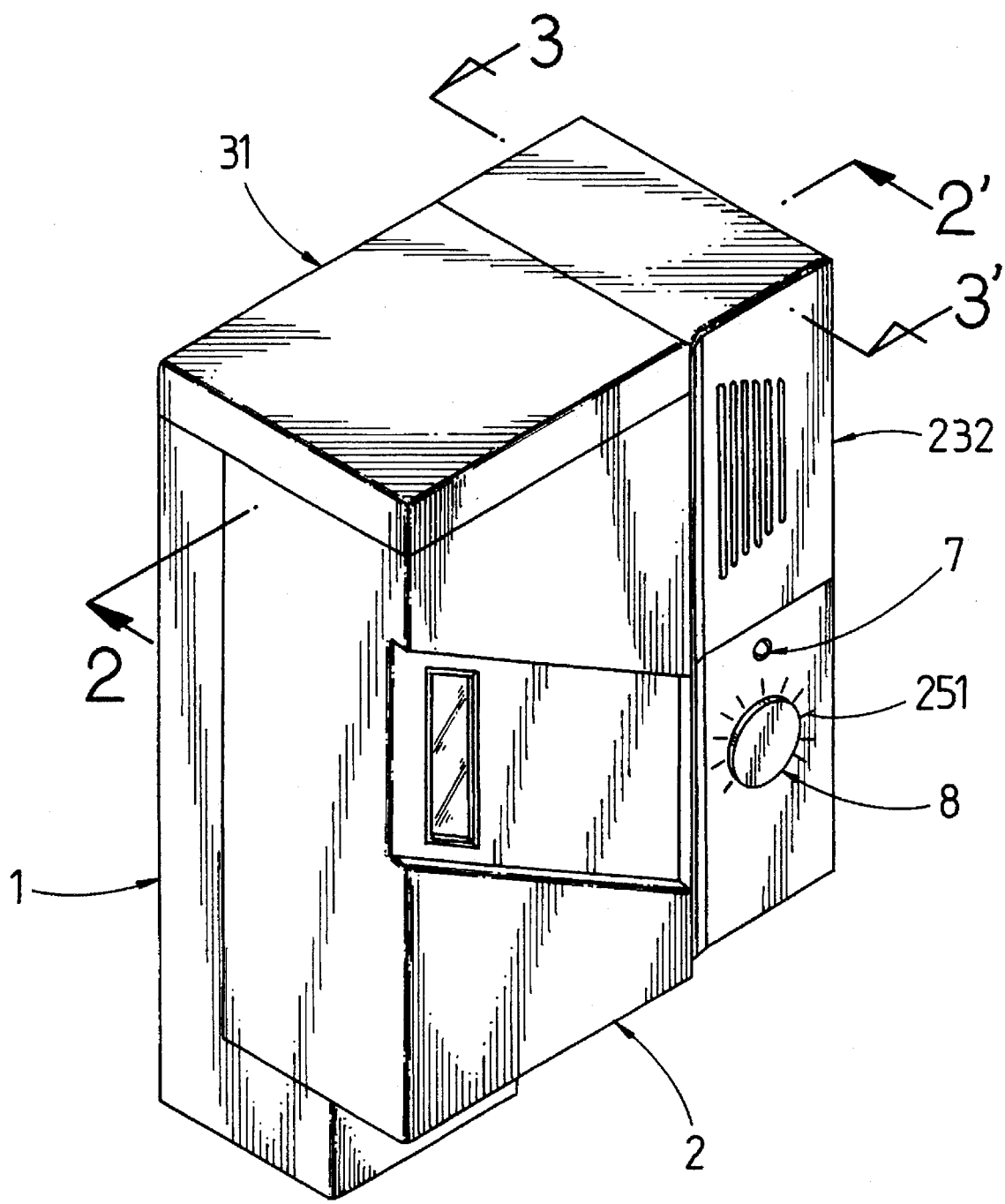
FIG. 1 is an elevational view of the present invention.

For the assembly of the present invention as shown in FIG. 2 and 3, first to mount the feed container 3 onto a lateral square C-shaped inserting edge 101 on the base body 10, then to mount the motor 42 of feed-dropping device 4 onto the motor mounting frame 14 of base body 10, to fix the feed-vibrating plate 40 onto the flange 34 around the inclined opening edge 33 at the lower end of feed container body 30, to insert the shaft of motor 42 into the rod 410 of feed-vibrating crank 41, to insert the feed-dropping nozzle 50 assembled with the spring 52 and the piston 51 into the feed-dropping nozzle inserting hole 15 on the horizontal base plate 11 of base body 10 and to fix the said nozzle 50 onto the positioning plate 17; and then to insert the lever-pushing plate 53 of switch device 5 into the lever-pushing plate mounting groove 16 on the horizontal base plate 11 of base body 10, to dispose the point of bird's bill plate 536 of bird's head shaped plate 531 in the position between the feed-dropping nozzle 50 and the small protruding shaft 513 on the piston 51, and to mount a tension spring 54 in the position between the bird's head shaped plate 531 and the protruding piece 103 on the horizontal base plate 11 of base body 10; and finally, to mount the PCB 9 onto some protruding pillars 15 on the base body 10, to insert the power source input ends of positive and negative poles thereon into the conducting plate 132 of positive and negative poles inserted onto the battery supporting plate 13 on the base body 10 through welding so as to assemble the main base 1 with the panel 2, then to insert the knob 8 into the large fish-eye hole 25 on the plate body 20, to dispose the movable lid plate 232 onto the W-shaped battery mounting groove 23, and to dispose a movable lid 31 onto the feed container 3, the automatic feed supply machine according to the present invention as shown in FIG. 1 is well assembled for installation and use.

For installation and use thereof, first to fix the hanging frame 6 onto a wall, then to insert the four stall reverse L-shaped engaging pieces 102 on the back side of base body 10 into the hanging frame 6, to remove the movable lid plate 232 from the panel 2, to dispose four batteries in the battery mounting groove 23, or to connect the power source socket 92 to the power source socket of home electric appliances thru a power source extension wire with rectifier and transformer, and finally, to put the required food or material into the feed container 3 and to cover the container 3 with a lid 31, the present invention is ready for use.

For factual use of the present invention, all to do is to turn the knob 8 on the panel 2, to set the feed-dropping time rand quantity, use one hand holding a cup or container to press against and contact with as possible the reverse L-shaped plate 532 on the lower side of lever-pushing plate 53 (as shown in FIG. 6) to push the piston 51 in the feed-dropping nozzle 50 to the right to open the elliptic hole 501 on one side of square tube 500 of the feed-dropping nozzle 50 horizontally through the bird's bill plate 536 on the bird's head shaped plate 531 on the right upper side of lever-pushing plate 53 (as shown in FIG. 4), the protruding pillar 537 on the upper side of bird's head shaped plated 531 presses against and contacts with the spring leaf switch 93 on the PCB 9 to immediately turn on the circuit of PCB 9, to run the motor 42 in in the feed-dropping device 4, to drive the feed-vibrating crank 41 operating up and down continuously, to actuate the feed-vibrating plate 40 vibrating up and down so as to vibrate the food or material in the feed container body 30 to move the food or material therein to the feed-dropping outlet 37 through the gap between the feed damper 38 in the container body 30 and the feed-vibrating plate 40, and then the said food or material is pushed to drop down into the feed-dropping nozzle 50 and into the said cup or container, and then the operations of power and feed supply will automatically stop at once and the user may take out the cup or container held by him for eating or feeding without worrying about that the quantity of food or material is too much or less. If he would like to use the present machine once again or next one would like to use it, all to do is to follow the foregoing sequence so its operation and use are very simple, convenient and quick. In order to conveniently set the foregoing feed-dropping quantity, some scales 251 may be provided around the large fish-eye hole 25 of knob 8 on the plate body 20 so as to conveniently set and adjust more or less feed-dropping quantity for the user as shown in FIG. 1 and 5.

I claim:
1. An automatic feed machine, comprising:
 a. a housing, said housing including:
  i. a main base having a horizontal base plate at a lower end thereof, a motor mounting frame on said horizontal base plate, a feed-dropping nozzle insertion hole in said horizontal base plate and a lever receiving groove in said horizontal base plate; a vertical partition board extending from adjacent said horizontal base plate and approximately at the center of the main base; a horizontal battery supporting plate at the center of said vertical partition board; and
  ii. a panel which mounts to the main base and together with the main base encloses said horizontal base plate, said vertical partition board and said horizontal battery supporting plate;

b. a feed container for storing material to be dispensed mounted within the housing between said main base and said panel and disposed above said horizontal base plate and to one side of said vertical partition board, said feed container including:
   i. a movable lid for closing an open top thereof;
   ii. a flexible rubber bottom which slopes towards an opening therein, said opening communicating with a feed-dropping nozzle inserted within said feed-dropping nozzle insertion hole of said horizontal base plate;
   iii. a feed damper within the feed container disposed above the opening;
   iv. a feed pushing plate for pushing feed towards the opening; and
   v. a disk, spring biased against the opening in the feed container for closing said opening;
c. means for operating said dispenser, said means for operating comprising:
   i. a spring biased lever extending through said lever receiving groove in said horizontal base plate adjacent the lower end of said feed-dropping nozzle, said lever having a cup actuating end for engagement by a cup and an operating end within said housing, said operating end including means thereon for engaging a protrusion on a rod connected to said disk for moving said disk from a closed position to an open position upon movement of said lever by a cup;
   ii. a motor mounted to said motor mounting frame on said horizontal base plate, said motor being connected to a crank having means thereon for vibrating said flexible rubber bottom of said feed container and for moving said feed pushing plate;
   iii. batteries mounted on said horizontal battery supporting plate and operatively connected to said motor and a switch; and
   iv. a protrusion on said operating end of said lever for engaging said switch to operate the motor upon movement of said lever by a cup;
whereby, upon moving said lever from a rest position to an actuated position by a cup, said disk is moved to an open position, said flexible rubber bottom of said feed container is vibrated to agitate the feed within the feed container, said feed pushing plate is moved to push feed to the opening and feed is dispensed through said feed-dropping nozzle.

2. An automatic feed machine as set forth in claim 1, further comprising:
timer means for controlling the length of time the motor is operated.

3. An automatic feed machine as set forth in claim 1, further comprising:
means for mounting said housing on a vertical surface.

4. An automatic feed machine as set forth in claim 1, further comprising:
a window in said panel aligned with a window in said feed container to enable the level of feed within the feed container to be viewed.

* * * * *